(12) United States Patent
Chou et al.

(10) Patent No.: US 8,953,013 B2
(45) Date of Patent: Feb. 10, 2015

(54) IMAGE PICKUP DEVICE AND IMAGE SYNTHESIS METHOD THEREOF

(75) Inventors: Hong-Long Chou, Taipei (TW); Chia-Chun Tseng, Hsinchu (TW); Chia-Yu Wu, Hsinchu (TW)

(73) Assignee: Altek Corporation, Hsinchu (TW)

( * ) Notice: Subject to any disclaimer, the term of this patent is extended or adjusted under 35 U.S.C. 154(b) by 427 days.

(21) Appl. No.: 13/561,454

(22) Filed: Jul. 30, 2012

(65) Prior Publication Data

US 2013/0307922 A1 Nov. 21, 2013

(30) Foreign Application Priority Data

May 17, 2012 (TW) .............................. 101117658 A (51) Int. Cl.
*H04N 7/00* (2011.01)

(52) U.S. Cl.
USPC .................. 348/36; 348/47; 348/68; 348/74; 348/97; 348/107; 348/208.12; 348/211.4; 348/221.1; 348/222.1; 348/223.1; 348/229.1; 348/231.99; 348/234; 348/236; 348/238; 348/345; 348/353; 348/362; 348/365; 348/374; 348/375; 348/376; 348/391.1; 348/474; 348/508; 348/639; 348/646; 348/651; 348/655; 348/660; 348/672; 348/720; 348/725; 396/122; 396/123; 396/182; 396/229; 396/233; 396/236

(58) Field of Classification Search
USPC .............. 348/36, 47, 68, 74, 97, 107, 208.12, 348/211.4, 221.1, 222.1, 223.1, 229.1, 348/231.1, 231.99, 234, 236, 238, 345, 353, 348/362, 365, 374, 375, 376, 396.1, 474, 348/508, 639, 646, 651, 660, 672, 720, 348/725; 396/122, 123, 182, 229, 233, 236
See application file for complete search history.

(56) References Cited

U.S. PATENT DOCUMENTS

| | | | | |
|---|---|---|---|---|
| 6,285,398 B1 * | 9/2001 | Shinsky et al. | ............ | 348/223.1 |
| 7,428,008 B2 * | 9/2008 | Okamoto et al. | .......... | 348/222.1 |
| 7,486,314 B2 * | 2/2009 | Shibutani | ................... | 348/231.7 |
| 8,488,958 B2 * | 7/2013 | Brunner et al. | ............... | 396/236 |
| 8,736,739 B2 * | 5/2014 | Yoshida | ........................ | 348/339 |
| 8,760,541 B2 * | 6/2014 | Fukuya et al. | ................ | 348/239 |
| 8,872,887 B2 * | 10/2014 | Bigioi et al. | .................... | 348/36 |
| 2004/0046877 A1 * | 3/2004 | Shibutani | ................... | 348/231.1 |
| 2005/0104957 A1 * | 5/2005 | Okamoto et al. | ............... | 348/97 |
| 2006/0062487 A1 * | 3/2006 | Ouchi | .......................... | 382/284 |
| 2008/0174667 A1 * | 7/2008 | Okada et al. | .............. | 348/220.1 |

(Continued)

*Primary Examiner* — Jefferey Harold
*Assistant Examiner* — Mustafizur Rahman
(74) *Attorney, Agent, or Firm* — Muncy, Geissler, Olds & Lowe, P.C.

(57) ABSTRACT

This invention discloses an image pickup device and an image synthesis method thereof The image pickup device comprises an image-pickup module, an image-synthesis module, a database and a processing module. The image-pickup module captures a plurality of temporary images of a scene. The image-synthesis module extracts a part of each temporary image and combines the parts to form a panorama temporary image, and splits the panorama temporary image into a plurality of zone-areas according to at least one threshold value and a panorama luminosity histogram. The database stores a lookup table for recording a plurality of exposure values. The plurality of the exposure values correspond to luminance values of the zone-areas respectively. The processing module obtains the plurality of exposure values corresponding to the luminance values and obtains a weighting-exposure value by an equation, and controls the image-pickup module to capture the panorama image according to the weighting-exposure value.

15 Claims, 6 Drawing Sheets

(56) References Cited

U.S. PATENT DOCUMENTS

| | | |
|---|---|---|
| 2010/0111429 A1* | 5/2010 | Wang et al. .................... 382/233 |
| 2011/0025865 A1* | 2/2011 | Kunishige et al. ......... 348/220.1 |
| 2011/0216157 A1* | 9/2011 | Bigioi et al. .................... 348/36 |
| 2011/0216158 A1* | 9/2011 | Bigioi et al. .................... 348/36 |
| 2011/0293259 A1* | 12/2011 | Doepke et al. ................ 396/236 |
| 2012/0194705 A1* | 8/2012 | Yoshida ........................ 348/238 |
| 2013/0050531 A1* | 2/2013 | Fukuya et al. ................ 348/239 |

\* cited by examiner

IMAGE PICKUP DEVICE AND IMAGE SYNTHESIS METHOD THEREOF

CROSS-REFERENCE TO RELATED APPLICATION

This application claims the benefit of Taiwan Patent Application No. 101117658, filed on May 17, 2012, in the Taiwan Intellectual Property Office, the disclosure of which is incorporated herein in its entirety by reference.

BACKGROUND OF THE INVENTION

1. Field of the Invention

The present invention relates to an image pickup device and an image synthesis method thereof, and more particularly to the image pickup device and the image synthesis method that adjust the weights of the exposure value of a scene.

2. Description of Related Art

As digital science and technology advance, digital camera becomes a necessary 3C product in the digital era, and most people would like to record beautiful scenes during a trip. If a user wants to record a large beautiful scene, the user generally cannot record the whole beautiful scene in one image, or if the user wants to record a complete scene from each visual angle indoors, the user generally fails to do so. Therefore, a panorama picture produced by combining several pictures is developed.

In the process of combining images, some users perform exposures and shoot a scene from different angles, and then combine a plurality of images to form a panorama image. Since the average exposure value of each image is different, therefore the whole image of each image is inconsistent, and thus the panorama image may have obvious inconsistent luminance and result in a poor quality.

In the process of combining the images, some other users base on the exposure value of the first picture taken as a reference and adopt the parameters to take pictures that follow, so as to assure that the luminance of different image in the scene is consistent, and avoid the occurrence of unnatural effects caused by the inconsistent luminance of the panorama image. However, if the change of luminance in the scene is too large and a high luminance is used for shooting the scene at the beginning, then the a shorter exposure time or smaller aperture will be used to reduce the amount of entering light after metering, and such arrangement will cause a darker area of the image to be too dark due to insufficient exposure, or even will result in a too-dark condition to recognize any object in the image. Similarly, if a too-low luminance is used to shoot a scene, a brighter area may become too bright or turn into a whitening condition due to over-exposure.

In view of the aforementioned problems, the inventor of the present invention designed an image pickup device and an image synthesis method to overcome the drawbacks of the prior art, and improved the industrial application.

SUMMARY OF THE INVENTION

Therefore, it is a primary objective of the invention to provide an image pickup device and an image synthesis method of the image pickup device to overcome the problems of the prior art having too-dark or too-bright areas and insufficient or excessive exposure.

To achieve the foregoing objective, the present invention provides an image pickup device for shooting a scene, and the image pickup device comprises: an image-pickup module, an image-synthesis module, a database and a processing module. The image-pickup module captures a plurality of temporary images of the scene. The image-synthesis module extracts a part of each of the temporary images, combines the parts of the temporary images to form a panorama temporary image, and splits the panorama temporary image into a plurality of zone-areas according to at least one threshold value and a panorama luminosity histogram of the panorama temporary image. The database stores a lookup table that records a plurality of exposure values, and the plurality of exposure values correspond to luminance values of the zone-areas respectively. The processing module obtains the plurality of exposure values corresponding to the luminance values respectively from the database, obtains a weighting-exposure value by an equation, and controls the image-pickup module to perform a panorama image capturing process according to the weighting-exposure value. In the equation, each of the exposure values is multiplied with a ratio of the zone-area corresponding to each of the luminance values to the total area and then the products are summed to generate the weighting-exposure value.

Wherein, the image-synthesis module synthesizes the panorama luminosity histogram by a temporary luminosity histogram of each of the temporary images and uses the most densely distributed luminance area of each of the temporary luminosity histograms in the panorama luminosity histogram as the zone-area.

Wherein, the image-synthesis module determines the threshold value according to the quantity of temporary images.

Wherein, the luminance value is an average luminance of the corresponding zone-area, an average value of the maximum luminance and the minimum luminance or a difference of the maximum luminance and the minimum luminance.

Wherein, the image-synthesis module extracts a vertical image at the middle section of each of the temporary images and combines the vertical images to form the panorama temporary image.

To achieve the aforementioned objective, the present invention further provides an image synthesis method for shooting a scene, and the image synthesis method comprises the following steps:

An image-pickup module captures a plurality of temporary images of the scene.

An image-synthesis module extracts a part of each of the temporary images, and combines the parts to form a panorama temporary image.

The image-synthesis module splits the panorama temporary image into a plurality of zone-areas according to at least one threshold value and a panorama luminosity histogram of the panorama temporary.

A database is provided to store a lookup table that records a plurality of exposure values, wherein the plurality of exposure values correspond to luminance values of the zone-areas respectively.

A processing module obtains the plurality of exposure values corresponding to the luminance values respectively from the database, and multiplies each of the exposure value to a ratio of the zone-area corresponding to the luminance value to the total area, and then sums up the products to generate a weighting-exposure value.

The processing module controls the image-pickup module to capture the panorama image according to the weighting-exposure value.

Wherein, the method further comprises the steps of: synthesizing a temporary luminosity histogram of each of the temporary images to form the panorama luminosity histogram by the image-synthesis module; and using the most densely distributed luminance area of each of the temporary luminosity histograms in the panorama luminosity histogram as the zone-area.

Wherein, the method further comprises the step of determining the threshold value according to the quantity of temporary images by the image-synthesis module.

Wherein, the luminance value is an average luminance of the corresponding zone-area, an average value of the maximum luminance and the minimum luminance or a difference of the maximum luminance and the minimum luminance.

Wherein, the method further comprises the steps of: using the image-synthesis module to extract a vertical image at a middle section of each of the temporary images and combining the vertical images to form the panorama temporary image.

To achieve the aforementioned objective, the present invention further provides an image pickup device, comprising: an exposure module, an image-pickup module, an image-synthesis module, a database and a processing module. The exposure module meters a scene to produce a plurality of temporary exposure values. The image-pickup module captures a plurality of temporary images of the scene according to each of the temporary exposure values. The image-synthesis module extracts a part of each of the temporary images, combines the parts of the temporary images to form a panorama temporary image, and splits the panorama temporary image into a plurality of zone-areas according to at least one threshold value and a panorama luminosity histogram of the panorama temporary image. The database stores a lookup table that records a plurality of exposure values, and the plurality of exposure values correspond to luminance values of the zone-area respectively. The processing module obtains the plurality of exposure values corresponding to the luminance values respectively from the database, obtains a weighting-exposure value by an equation, and controls the image-pickup module to perform a panorama image capturing process according to the weighting-exposure value.

Wherein, the image-synthesis module synthesizes the panorama luminosity histogram by a temporary luminosity histogram of each of the temporary images and uses the most densely distributed luminance area of each of the temporary luminosity histograms in the panorama luminosity histogram as the zone-area.

Wherein, the image-synthesis module determines the threshold value according to the quantity of temporary images.

Wherein, the luminance value is an average luminance of the corresponding zone-area, an average value of the maximum luminance and the minimum luminance or a difference of the maximum luminance and the minimum luminance.

Wherein, the image-synthesis module extracts a vertical image at the middle section of each of the temporary images and combines the vertical images to form the panorama temporary image.

In summation, the image pickup device and the image synthesis method of the present invention have one or more of the advantages:

The image pickup device and the image synthesis method of the prevent invention can continue metering a scene to obtain the exposure values in dark and bright areas of the scene, and adjust the weights according to the exposure values of these bright and dark areas to obtain a weighting-exposure value, and finally captures the panorama image accordingly, so as to achieve the effects of improving the consistence of the exposure of the panorama image and avoiding insufficient exposure in dark areas and over-exposure in bright areas.

DETAILED DESCRIPTION OF THE PREFERRED EMBODIMENTS

The technical contents and characteristics of the present invention will be apparent with the detailed description of a preferred embodiment accompanied with related drawings as follows. For simplicity, same numerals are used in the following preferred embodiment to represent respective same elements.

The image pickup device of the present invention can be a digital camera, a camera phone, a Smartphone, a digital video camera, a flat PC each or any portable electronic device with a photographic function. To facilitate the illustration of the technical characteristics of the present invention, digital cameras are used for the purpose of illustrating the present invention, but it is noteworthy to point out that the invention is not limited to the digital cameras only.

Figure 1:
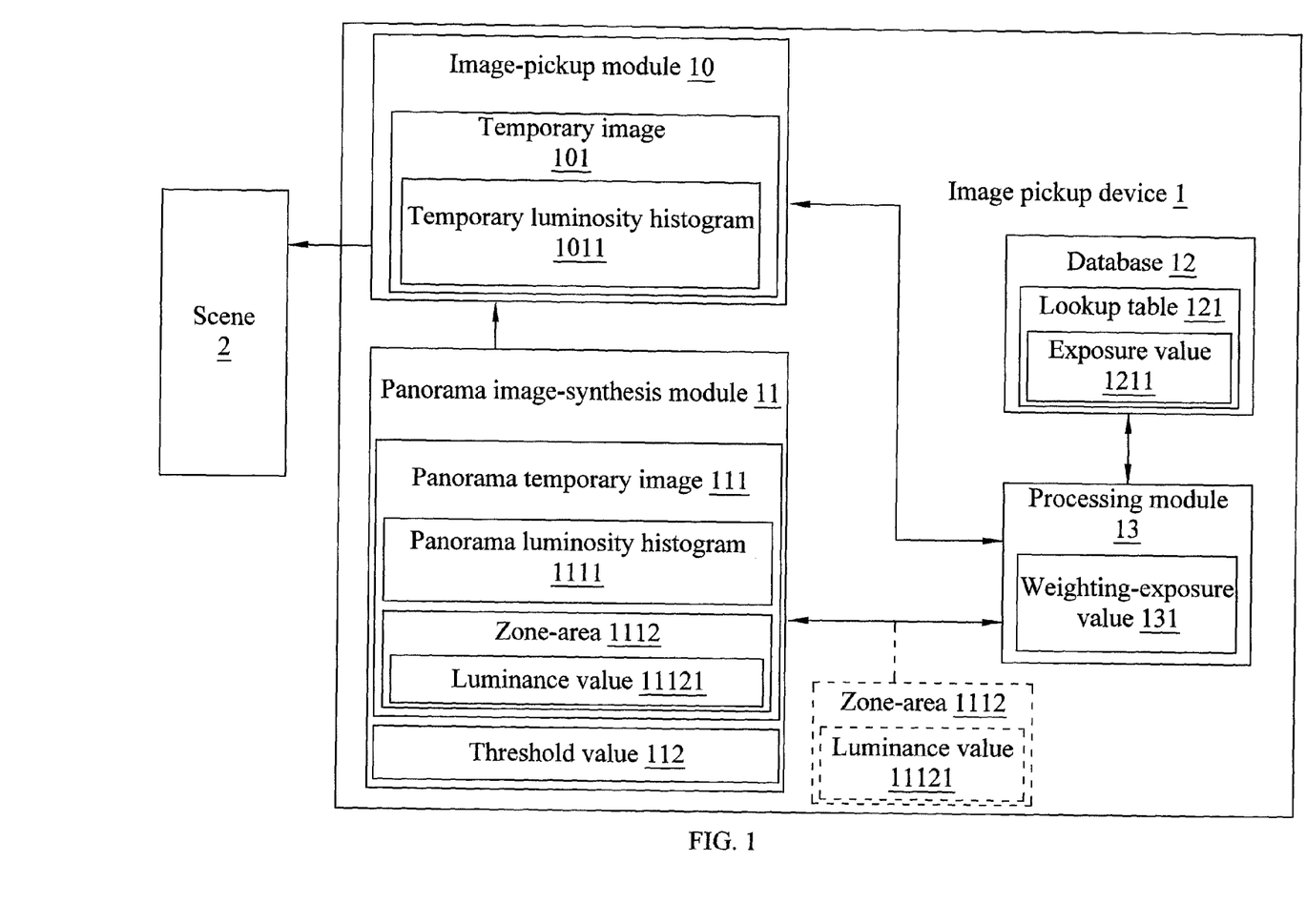
FIG. 1 is a block diagram of an image pickup device in accordance with a preferred embodiment of the present invention.

With reference to FIG. 1 for a block diagram of an image pickup device in accordance with a preferred embodiment of the present invention, the image pickup device 1 comprises an image-pickup module 10, an image-synthesis module 11, a database 12 and a processing module 13. The image-pickup module 10 is provided for capturing a plurality of temporary images 101 of a scene 2. The image-pickup module 10 can comprise a camera lens, a sensor such as a complementary metal oxide semiconductor (CMOS) or charge coupled device (CCD) sensor, an analog/digital circuit, or an image processor. The image-synthesis module 11 is provided for extracting a part of each of the temporary images 101, combining the parts to form a panorama temporary image 111, and splitting the panorama temporary image 111 into a plurality of zone-areas 1112 according to at least one threshold value 112 and a panorama luminosity histogram 1111 of the panorama temporary image 111. The database 12 stores a lookup table 121 that records a plurality of exposure values 1211. Wherein, the plurality of exposure values 1211 correspond to luminance values 11121 of the corresponding zone-areas 1112 respectively.

The processing module is electrically coupled to the image-pickup module 10, the image-synthesis module 11 and the database 12, and the processing module 13 can be a central processing unit (CPU) or a micro-processing unit). The processing module 13 obtains a plurality of exposure values 1211 corresponding to the luminance values 11121 respectively, and uses an equation to obtain a weighting-exposure value 131. In the equation, each exposure value 1211 is multiplied to a ratio of the zone-area 1112 corresponding to each of the luminance values 11121 to total area, and then the products are summed. The processing module 13 further controls image-pickup module 10 to perform a panorama image capturing process according to the weighting-exposure value 131. The equation is given below:

$$T_W = T_1 \frac{A_1}{A_1 + A_2 + \ldots} + T_2 \frac{A_2}{A_1 + A_2 + \ldots} + \ldots ;$$

Wherein, $T_W$ is the weighting-exposure value, $T_1, T_2 \ldots$ are exposure values $T_1, T_2 \ldots$, and $A_1, A_2 \ldots$ are zone-areas corresponding to the luminance values of the corresponding exposure values respectively.

Figure 2:
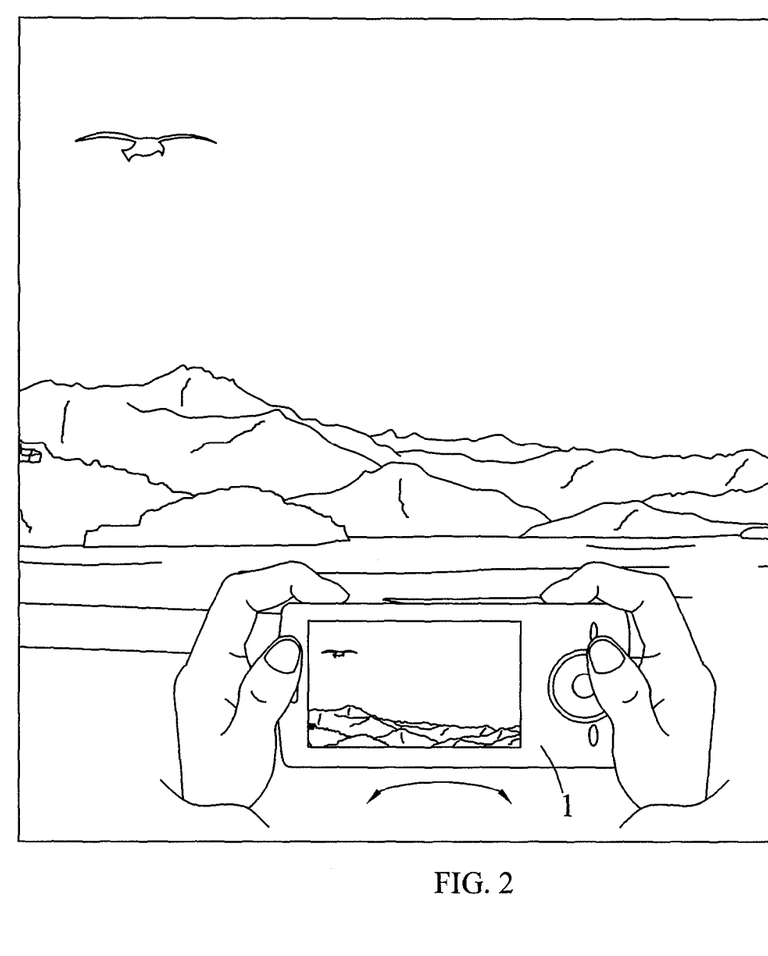
FIG. 2 is a schematic view of an image pickup device in accordance with a preferred embodiment of the present invention.
Figure 3:
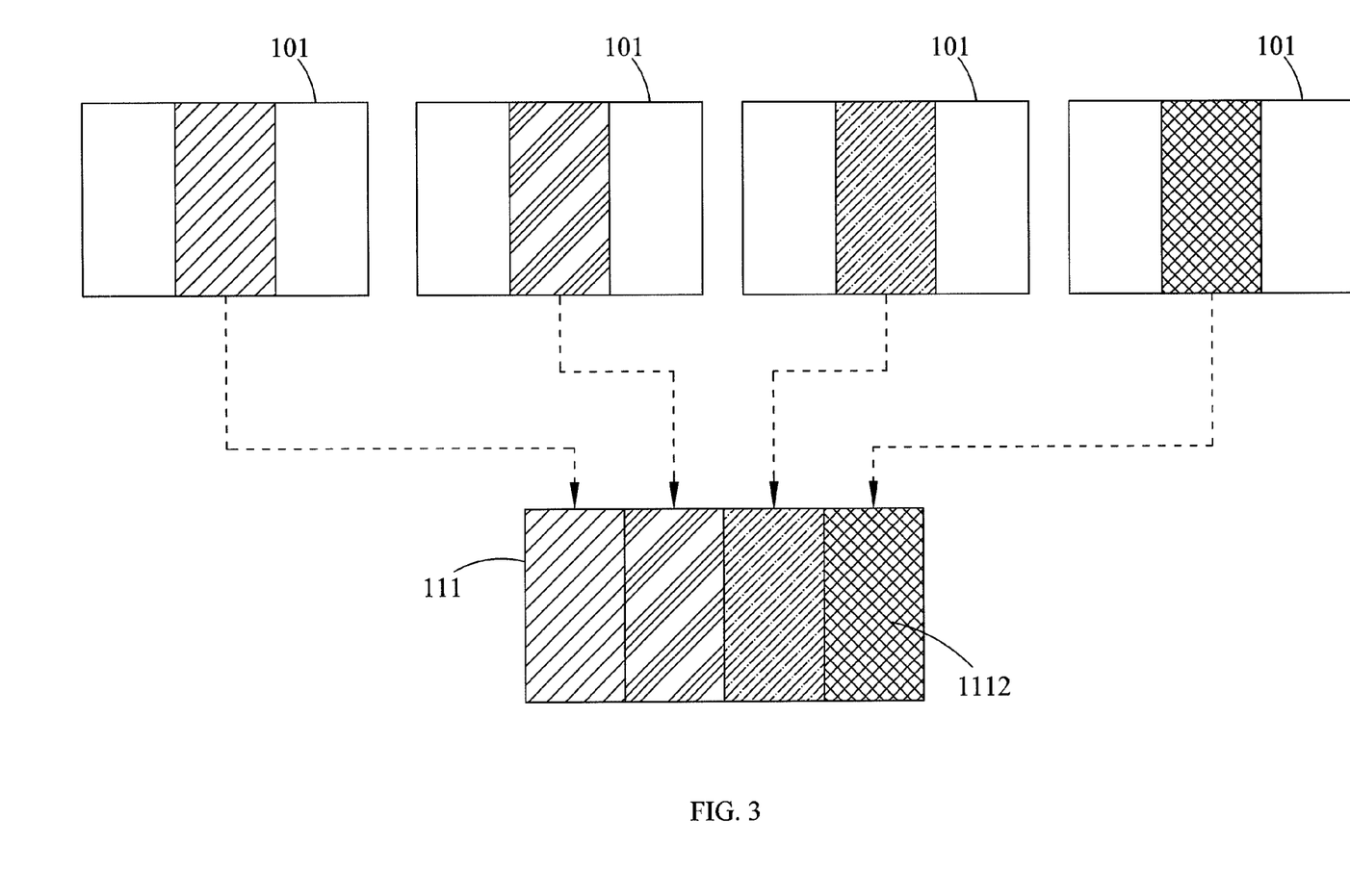
FIG. 3 is a schematic view of connecting temporary images by an image pickup device in accordance with a preferred embodiment of the present invention.

With reference to FIGS. 2 and 3 are schematic views of an image pickup device and using the image pickup device to combine temporary image in accordance with a preferred embodiment of the present invention respectively, when a user uses the image pickup device 1 to meter and scan a scene 2, the image-pickup module 10 captures a plurality of temporary images 101 (such as the images in live view shown in the image pickup device 1) of the scene 2. The image-synthesis module 11 combines the temporary images 101 and extracts a vertical image at the middle section of each of the temporary images 101, and combines the vertical images to form a panorama temporary image 111 and further obtain a panorama luminosity histogram 1111 of the panorama temporary image 111.

Figure 4:
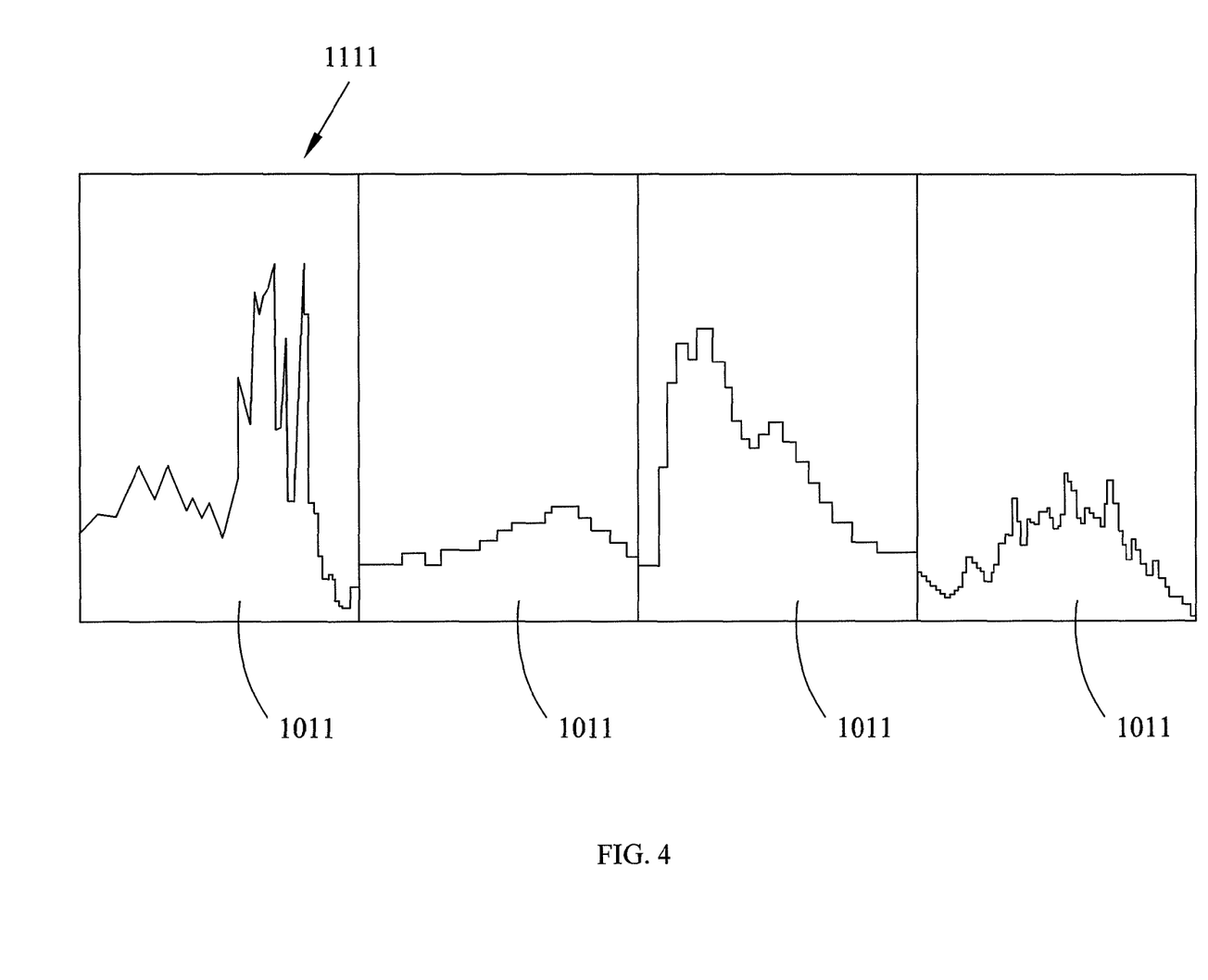
FIG. 4 is a schematic view showing a threshold value of an image pickup device in accordance with a preferred embodiment of the present invention.

With reference to FIG. 4 for a schematic view showing a threshold value of an image pickup device in accordance with a preferred embodiment of the present invention, the image-synthesis module 11 combines each of the temporary images 101 into a panorama temporary image 111, and also combines the temporary luminosity histograms 1011 of the temporary images 101 to form a panorama luminosity histogram 1111. Find the most densely distributed luminance area of the temporary luminosity histograms 1011 of the panorama luminosity histogram 1111 as a zone-area 1112 of each temporary image 101, so as to obtain a luminance value 11121 of each corresponding zone-area 1112. Now, the quantity of temporary image 101 is set as a threshold value 112. And then, the processing module 13 obtains a plurality of exposure values 1211 corresponding to each luminance value 11121 from the database 12. In Table 1, when the luminance value 11121 of a zone-area 1112 is equal to 0.063, the processing module 13 can obtain the exposure value which is equal to 1 corresponding the luminance value 11121 which is equal to 0.063 according to the plurality of exposure values 1211 stored in the database 12. However, the values in Table 1 can be changed according to the aperture, and thus are not limited to those listed in the table only. It is noteworthy that the luminance value 11121 can be an average luminance of the corresponding zone-area 1112, an average value of the maximum luminance and the minimum luminance, or a difference of the maximum luminance and the minimum luminance, and changes and adjustments can be made in practical applications.

TABLE 1

Exposure values corresponding to different luminance values

| Luminance value | Exposure value |
|---|---|
| 0.031 | ½ |
| 0.063 | 1 |
| 0.125 | 2 |

TABLE 1-continued

Exposure values corresponding to different luminance values

| Luminance value | Exposure value |
|---|---|
| 0.25 | 4 |
| 0.5 | 8 |

After obtaining the luminance value 11121 of each zone-area 1112 by processing module 13, the processing module 13 calculates the luminance values 11121 by an equation to obtain a weighting-exposure value 131, and the equation has been described in details already, and thus will not be repeated. Now, the processing module 13 will use the weighting-exposure value 131 as an exposure value of the image-pickup module 10 within a predetermined time for capturing images, such that users can use a shutter (not shown in the figure) or a shutter cable (not shown in the figure) to perform a panorama image capturing process in order to obtain a panorama image with appropriate luminance. In other words, the dark area will not be too dark, and the bright area will not be too bright.

Figure 5:
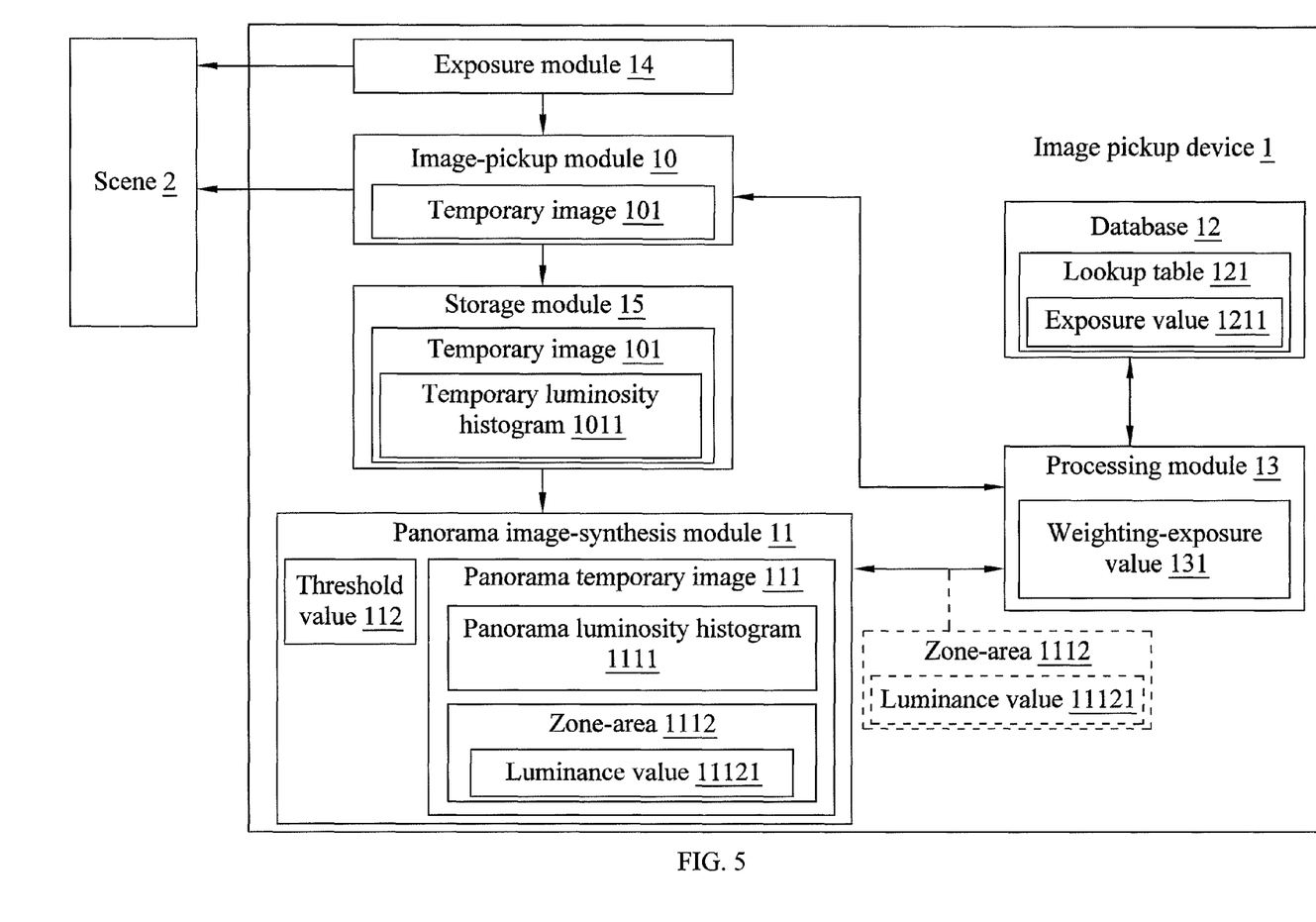
FIG. 5 is a block diagram of an image pickup device in accordance with another preferred embodiment of the present invention.

With reference to FIG. 5 for a block diagram an image pickup device in accordance with another preferred embodiment of the present invention, this preferred embodiment is substantially the same as the foregoing preferred embodiment, and only their difference will be described below. The image pickup device 1 comprises: an image-pickup module 10, an image-synthesis module 11, a database 12, a processing module 13, an exposure module 14 and a storage module 15. In the image pickup device 1, the exposure module 11 has an auto exposure (AE) adjustment mechanism including aperture ratio, shutter, and ISO light sensing. When a user wants to meter a plurality of temporary images 101 to shoot a scene 2, the image-pickup module 10 can produce a plurality of temporary images and save them into the storage module 15. Wherein, the storage module 15 can be an embedded memory, an external memory card, or a combination of the above.

The user uses the image pickup device 1 to pre-scan a panorama and detects the light of the scene 2 by auto exposure mechanism of the exposure module 14, so as to calculate the exposure values of the plurality of temporary images 101 of the scene 2 for combining the panorama. The image-pickup module 10 produces the temporary images 101 and the corresponding temporary luminosity histograms 1011, and saves them into the storage module 15. The image-synthesis module 11 obtains the temporary images 101 and combines the temporary images 101 to form the panorama temporary image 111, and a threshold value 112 and a panorama luminosity histogram 1111 of a panorama temporary image 111 are used to split the panorama temporary image 111 into a plurality of zone-areas 1112. Of course, the exposure value of the initial scan can be uses as the exposure value of the temporary images 101 in order to obtain a more consistent panorama temporary image 111.

In addition, the image pickup device 1 further includes a gravity sensing module (not shown in the figure) for sensing the way that the image pickup device 1 is disposed (either transversally or vertically) to issue a sensing signal, such that the image-synthesis module 11 can determine extracting the vertical image at the middle section of the plurality of temporary images 101 transversally or vertically according to the sensing signal 113, so as to improve the application of the image pickup device 1.

The processing module 13 looks up the lookup table 121 in the database 12 to find the luminance value 11121 according to each zone-area 1112 and determines whether there exists a corresponding exposure value 1211; if yes, then the processing module 13 will obtains each of the corresponding exposure values 1211, and multiple each exposure value 1211 by a ratio of the zone-area 1112 corresponding to the luminance value to the total area and sums up the products to obtain a weighting-exposure value 131, so that the user can capture the panorama image by the weighting-exposure value 131, and the captured panorama image is saved into the storage module 15.

Figure 6:
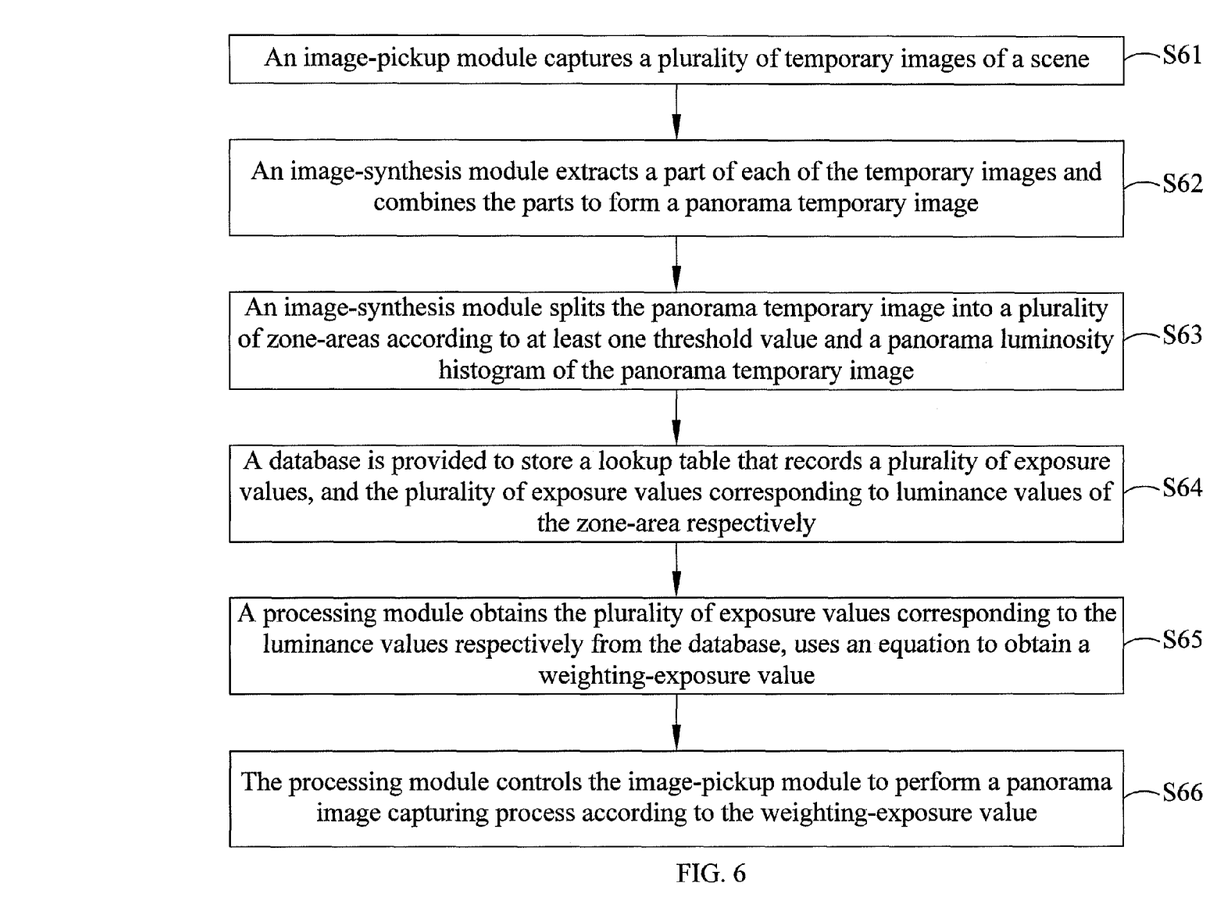
FIG. 6 is a flow chart of an image synthesis method of the present invention.

With reference to FIG. 6 for a flow chart of an image synthesis method of the present invention, the image synthesis method is applied in an image pickup device. The image pickup device comprises: an image-pickup module, an image-synthesis module, a database and a processing module. The image synthesis method comprises the following steps:

S61: An image-pickup module captures a plurality of temporary images of a scene.

S62: An image-synthesis module extracts a part of each of the temporary images and combines the parts to form a panorama temporary image.

S63: An image-synthesis module splits the panorama temporary image into a plurality of zone-areas according to at least one threshold value and a panorama luminosity histogram of the panorama temporary image.

S64: A database is provided to store a lookup table that records a plurality of exposure values, and the plurality of exposure values corresponding to luminance values of the zone-area respectively.

S65: A processing module obtains the plurality of exposure values corresponding to the luminance values respectively from the database, uses an equation to obtain a weighting-exposure value.

S66: The processing module controls the image-pickup module to perform a panorama image capturing process according to the weighting-exposure value.

The details and implementation of the image synthesis method the image pickup device of in accordance with the present invention have been described in the section of the image pickup device already, and thus will not be repeated.

What is claimed is:

1. An image pickup device for shooting a scene, comprising:
    an image-pickup module, arranged for capturing a plurality of temporary images of the scene;
    an image-synthesis module, arranged for extracting a part of each of the temporary images, combining the parts of the temporary images to form a panorama temporary image, and splitting the panorama temporary image into a plurality of zone-areas according to at least one threshold value and a panorama luminosity histogram of the panorama temporary image;
    a database, arranged for storing a lookup table that records a plurality of exposure values, and the plurality of exposure values corresponding to a luminance value of each the zone-area respectively; and
    a processing module, arranged for obtaining the plurality of exposure values corresponding to the luminance values respectively from the database, obtaining a weighting-exposure value by an equation, and controlling the image-pickup module to perform a panorama image capturing process according to the weighting-exposure value;
    wherein, the equation is to multiply each of the exposure values by a ratio of the zone-area corresponding to each of the luminance values to the total area and then sum up the products to generate the weighting-exposure value.

2. The image pickup device of claim 1, wherein the image-synthesis module synthesizes the panorama luminosity histogram by a temporary luminosity histogram of each of the temporary images and uses the most densely distributed luminance area of each of the temporary luminosity histograms in the panorama luminosity histogram as the zone-area.

3. The image pickup device of claim 2, wherein the image-synthesis module determines the threshold value according to the quantity of temporary images.

4. The image pickup device of claim 1, wherein the luminance value is an average luminance of the corresponding zone-area, an average value of the maximum luminance and the minimum luminance or a difference of the maximum luminance and the minimum luminance.

5. The image pickup device of claim 1, wherein the image-synthesis module extracts a vertical image at the middle section of each of the temporary images and combines the vertical images to form the panorama temporary image.

6. An image synthesis method for shooting a scene, comprising the steps of:
    capturing a plurality of temporary images of the scene by an image-pickup module;
    extracting a part of each of the temporary images and combining the parts to form a panorama temporary image by an image-synthesis module;
    splitting the panorama temporary image into a plurality of zone-areas according to at least one threshold value and a panorama luminosity histogram of the panorama temporary image by the image-synthesis module;
    providing a database to store a lookup table that records a plurality of exposure values, and the plurality of exposure values corresponding to luminance values of each the zone-areas respectively;
    using a processing module to obtain the plurality of exposure values corresponding to the luminance values respectively from the database, and multiply each of the exposure value by a ratio of the zone-area corresponding to the luminance value to the total area, and then sum up the products to generate a weighting-exposure value; and
    controlling the image-pickup module to perform a panorama image capturing process according to the weighting-exposure value by the processing module.

7. The image synthesis method of claim 6, further comprising the steps of:
    synthesizing a temporary luminosity histogram of each of the temporary images to form the panorama luminosity histogram by the image-synthesis module; and
    using the most densely distributed luminance area of each of the temporary luminosity histograms in the panorama luminosity histogram as the zone-area.

8. The image synthesis method of claim 7, further comprising the step of: determining the threshold value according to the quantity of temporary images by the image-synthesis module.

9. The image synthesis method of claim 6, wherein the luminance value is an average luminance of the corresponding zone-area, an average value of the maximum luminance and the minimum luminance or a difference of the maximum luminance and the minimum luminance.

10. The image synthesis method of claim 6, further comprising the steps of: using the image-synthesis module to extract a vertical image at a middle section of each of the temporary images and combining the vertical images to form the panorama temporary image.

11. An image pickup device, comprising:
- an exposure module, arranged for metering a scene to produce a plurality of temporary exposure values;
- an image-pickup module, arranged for capturing a plurality of temporary images from the scene according to each of the temporary exposure values;
- an image-synthesis module, arranged for extracting a part of each of the temporary images, combining the parts of the temporary images to form a panorama temporary image, and splitting the panorama temporary image into a plurality of zone-areas according to at least one threshold value and a panorama luminosity histogram of the panorama temporary image;
- a database, arranged for storing a lookup table that records a plurality of exposure values, and the plurality of exposure values corresponding to luminance values of each the zone-area respectively; and
- a processing module, arranged for obtaining the plurality of exposure values corresponding to the luminance values respectively from the database, using an equation to obtain a weighting-exposure value, and controlling the image-pickup module to perform a panorama image capturing process according to the weighting-exposure value;

wherein the equation is to multiply each of the exposure values by a ratio of the zone-area corresponding to each of the luminance values to the total area and then sum up the products to generate the weighting-exposure value.

12. The image pickup device of claim 11, wherein the image-synthesis module synthesizes the panorama luminosity histogram by a temporary luminosity histogram of each of the temporary images and uses the most densely distributed luminance area of each of the temporary luminosity histograms in the panorama luminosity histogram as the zone-area.

13. The image pickup device of claim 12, wherein the image-synthesis module determines the threshold value according to the quantity of temporary images.

14. The image pickup device of claim 11, wherein the luminance value is an average luminance of the corresponding zone-area, an average value of the maximum luminance and the minimum luminance or a difference of the maximum luminance and the minimum luminance.

15. The image pickup device of claim 11, wherein the image-synthesis module extracts a vertical image at the middle section of each of the temporary images and combines the vertical images to form the panorama temporary image.

* * * * *